United States Patent [19]

Miscevic et al.

[11] Patent Number: 5,477,898
[45] Date of Patent: Dec. 26, 1995

[54] METHOD AND APPARATUS FOR FILLING DRUMS WITH IMMISCIBLE LIQUIDS SUCH AS WHITE PHOSPHORUS AND WATER

[75] Inventors: Michel Miscevic, Epierre; Claude Cochet, La Chambre, both of France

[73] Assignee: Societe Atochem, Puteaux, France

[21] Appl. No.: 351,062

[22] Filed: Nov. 29, 1994

Related U.S. Application Data

[60] Continuation of Ser. No. 20,806, Feb. 22, 1993, abandoned, which is a division of Ser. No. 796,329, Nov. 22, 1991, Pat. No. 5,213,140.

[30] Foreign Application Priority Data

Nov. 23, 1990 [FR] France ........................ 90 14633

[51] Int. Cl.[6] ................... B67C 3/30; B67D 5/56
[52] U.S. Cl. ................ 141/105; 141/104; 141/181; 141/284
[58] Field of Search ...................... 141/9, 82, 83, 141/94, 100, 102, 105–107, 128, 129, 153, 181, 182, 192, 198, 251, 263, 284, 104

[56] References Cited

U.S. PATENT DOCUMENTS

| | | |
|---|---|---|
| 2,757,839 | 8/1956 | Carew . |
| 2,771,913 | 11/1956 | Flasnocker . |
| 2,919,724 | 11/1956 | Anderson ................................. 141/9 |
| 3,831,644 | 8/1974 | Berg et al. ............................ 141/82 |
| 3,908,719 | 9/1975 | Berg ..................................... 141/82 |
| 4,337,802 | 7/1982 | Kennedy et al. ..................... 141/1 |
| 4,344,469 | 8/1982 | Brown ................................. 141/90 |
| 4,890,774 | 1/1990 | Poore ............................. 141/102 X |
| 4,911,212 | 3/1990 | Burton ........................... 141/105 X |
| 4,932,445 | 6/1990 | Biehl .................................. 141/83 |
| 5,148,841 | 9/1992 | Graffin ............................... 141/83 |
| 5,168,905 | 12/1992 | Phallen ........................... 141/102 X |

FOREIGN PATENT DOCUMENTS

| | | | |
|---|---|---|---|
| 425509 | 5/1967 | Switzerland . | |
| 1413053 | 7/1988 | U.S.S.R. .......................... 141/115 |
| 2182309 | 5/1987 | United Kingdom ............... 141/91 |
| 2236146 | 3/1991 | United Kingdom ............... 141/102 |

Primary Examiner—J. Casimer Jacyna
Attorney, Agent, or Firm—Burns, Doane, Swecker & Mathis

[57] ABSTRACT

A drum is filled with two liquids of different densities which are immiscible when combined, such as white phosphorus and water. The drum is positioned on a scale beneath a fill pipe. An actuator lowers the fill pipe into the drum. A quantity of water is injected, followed by a quantity of white phosphorus, followed by a quantity of water to rinse the fill pipe. The fill pipe is raised just out of the liquids and allowed to drip, and then is fully raised to enable the filled drum to be replaced by an empty drum. The white phosphorus is injected at varying flow rates.

6 Claims, 4 Drawing Sheets

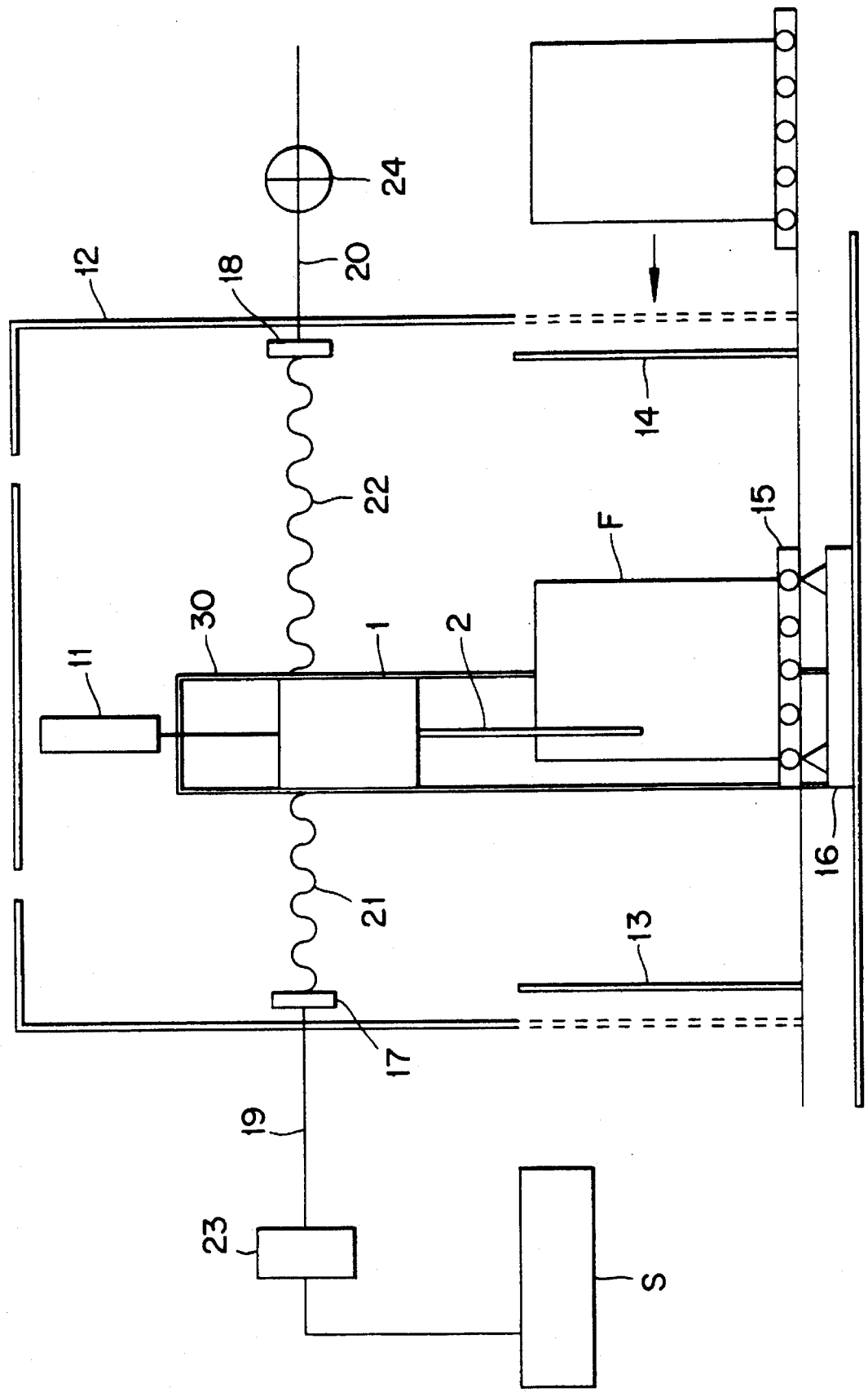

METHOD AND APPARATUS FOR FILLING DRUMS WITH IMMISCIBLE LIQUIDS SUCH AS WHITE PHOSPHORUS AND WATER

This application is a Continuation of application Ser. No. 08/020,806, filed Feb. 22, 1993, now abandoned which is a Divisional of application Ser. No. 07/796,329, filed Nov. 22, 1991, now U.S. Pat. No. 5,213,140 issued May 25, 1993.

BACKGROUND OF THE INVENTION

The present invention relates to methods and apparatus for filling drums with immiscible liquids, especially liquid white phosphorus and water.

Because of its high reactivity, white phosphorus must be handled with caution. In fact, being very oxidizable, it catches fire spontaneously in air so that it is necessary, in order to store it or to transport it, to cover it with an inert liquid such as water.

In order to carry out the filling, especially of metal drums, with liquid white phosphorus, the usual procedure is described below with reference to accompanying FIG. 1.

A first drum F1 is completely filled with hot water W1 (60°) and a second drum F2 is partially filled with a quantity of hot water W2 equivalent to a quantity necessary for covering the phosphorus which will eventually be added to the drum F1.

A funnel G comprising a lateral tubing is fitted onto the bung of the first drum F1 and the drum F2 is connected to the tubing of the funnel via a right-angle pipe P.

A rigid hollow rod R held by an operator B is inserted into the funnel, this hollow rod being connected via a hose not shown to a valve of a liquid phosphorus storage vessel, it being possible for this valve to be opened or closed by an operator A.

The operator A opens the valve, and the liquid phosphorus LP substantially fills the drum F1 while displacing the hot water from the drum F1 into the drum F2 and this is continued until the drum F2 is completely filled with hot water. This being confirmed by the operator B, the latter gives the order to the operator A to close the valve.

At this stage, the drum F1 is substantially filled with a specified quantity of liquid white phosphorus covered with the quantity of hot water equivalent to the quantity of water originally in the drum F2.

In order to carry out the filling of other drums, a drum F3 is filled with a quantity of hot water W3 equivalent to the quantity of water for covering the phosphorus, and the funnel G is fitted onto the bung of the drum F2. The drum F2 is connected to the drum F3 and the drum F2 is filled with liquid phosphorus as before and so forth.

Having completed the filling operation(s), the drums are allowed to cool for 24 hours in ambient air and then the following operations are carried out.

The procedure is to adjust the quantity of water above the solidified white phosphorus in such a manner as to provide the obligatory safety void of air above the water and the gross weight of the drums. This adjusting is carried out by siphoning out the excess water. The drums are passed one by one onto a weighing machine, and are then closed and subsequently transported one by one by a lift truck to a storage zone.

This procedure has a number of drawbacks. For example, there is some difficulty in controlling the level cf water in the "second" drum F2 which runs the risk of causing an overflow of the phosphorus from the drum during filling and consequently the risk of catching fire and burning the operator B. Also poor synchronization between the two operators can lead to the same result.

There is also some difficulty in passing the hollow rod R which is still filled with liquid white phosphorus, from one drum to another without risk of spurting.

Furthermore, various operations such as unscrewing the funnel and screwing it onto each drum, the siphoning, and the passing of the hollow rod from one drum to another with risk of rupturing the hose are manual operations which, not only are dangerous, but also are lengthy and tend to reduce productivity.

SUMMARY OF THE INVENTION

A method aspect of the invention for filling drums with two immiscible liquids which are of different densities and which are inert when combined, includes positioning a drum in such a manner that an opening of the drum is beneath a hollow filling rod. This hollow filling rod is inserted into the drum in such a manner that its outlet end is close to the bottom of the drum. A specified quantity $Q_1$ of the less dense liquid is injected and then a quantity of $Q_2$ of the denser liquid is injected. Then the hollow filling rod is rinsed by injecting a specified quantity $Q_3$ of the less dense liquid into the drum, followed by withdrawing the hollow filling rod.

Preferably, the hollow filling rod is withdrawn in two stages, first of all partially for promoting dripping of the rinsing liquid, and then completely.

Preferably, the drum to be filled was disposed on a weighing unit prior to the injecting steps.

One advantage of the method is that all or some of the operations may be carried out automatically.

This method is applicable most especially when the denser liquid is oxidizable, that is to say it relates to any liquid which, in contact with oxygen from the air, may especially degrade or spontaneously catch fire. It is applicable most particularly to the filling of a drum with liquid white phosphorus and water.

The filling of a drum with liquid white phosphorus and water according to the invention preferably comprises disposing a drum on a weighing unit in such a manner that at least one of the openings of the drum to be filled is placed beneath the end of a hollow immersion rod. The hollow rod is lowered until its outlet end is close to the bottom of the drum. The distance between the bottom of the drum and the end of the hollow immersion rod does not in general exceed 3 cm and preferably is between 0.5 cm and 2.5 cm. A specified quantity $Q_1$ of hot water is injected. Then, a specified quantity of $Q_2$ of liquid white phosphorus is injected. Then the hollow filling rod is rinsed by injecting a specified quantity $Q_3$ of hot liquid into the drum. Then, the hollow filling rod is withdrawn.

Advantageously, the filled drum is then transported away from the filling zone where it will be closed and then conveyed to a storage zone.

The filling of the quantity $Q_2$ of liquid white phosphorus may be carried out at a constant flow rate, but preferably a variable flow rate is used. Advantageously a low flow rate is used at the beginning and the end of filling, the flow rate being not less than 0.8 tons/hr and preferably from 0.9–1.1 tons/hr, and a higher flow rate is used during the rest of the filling time, this higher flow rate being not less than 8 tons/hr and preferably from 9–11 tons/hr.

The two quantities of water $Q_1$ and $Q_3$, together constitute a mass of water necessary for covering the liquid white phosphorus and such that there remains a void of air above the water level.

The white phosphorus is transported at a temperature greater than its melting point and preferably at a temperature of between 55° C. and 65° C.

The temperature of the water used for the filling and the rinsing of the hollow rod is in general not less than 50° C. and preferably between 60° C. and 70° C.

An apparatus for carrying out the invention comprises a dispensing head which includes a first inlet for introducing a first liquid, a second inlet for introducing a second liquid, and a common outlet conduit for the first and second liquids. The dispensing head also includes a first valve for opening and closing the first inlet, a second valve for opening and closing the second inlet, first and second conduits for conducting the first and second liquids from the first and second inlets, respectively, and a third valve interconnecting both the first and second conduits to the common outlet conduit.

Preferably, means is provided for positioning a drum beneath the outlet conduit. An actuator is provided for raising and lowering the outlet conduit for inserting the outlet conduit into a drum opening.

BRIEF DESCRIPTION OF THE DRAWINGS

The objects and advantages of the invention will become apparent from the following detailed description of a preferred embodiment thereof in connection with the accompanying drawings in which like numerals designate like elements, and in which:

FIG. 4 is a side elevational view of a drum filling apparatus in which the dispensing head is mounted.

DETAILED DESCRIPTION OF A PREFERRED EMBODIMENT OF THE INVENTION

Figure 1A:
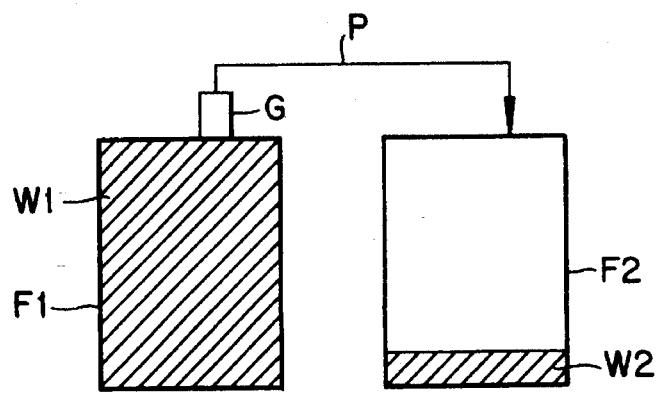
FIG. 1A is a schematic view depicting two drums prior to the initiation of a white phosphorus filling step according to the prior art.
Figure 1B:
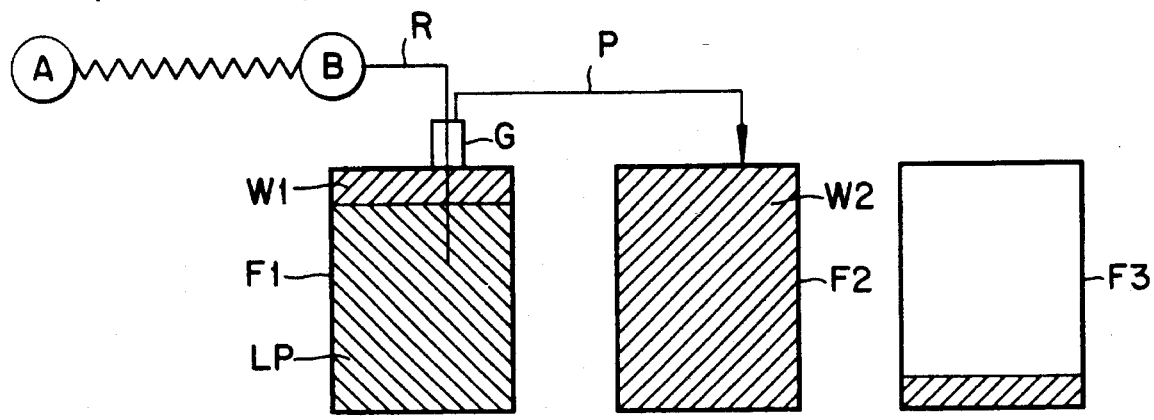
FIG. 1B is a view similar to FIG. 1A after a first drum has been filled with white phosphorus, according to the prior art.
Figure 1C:
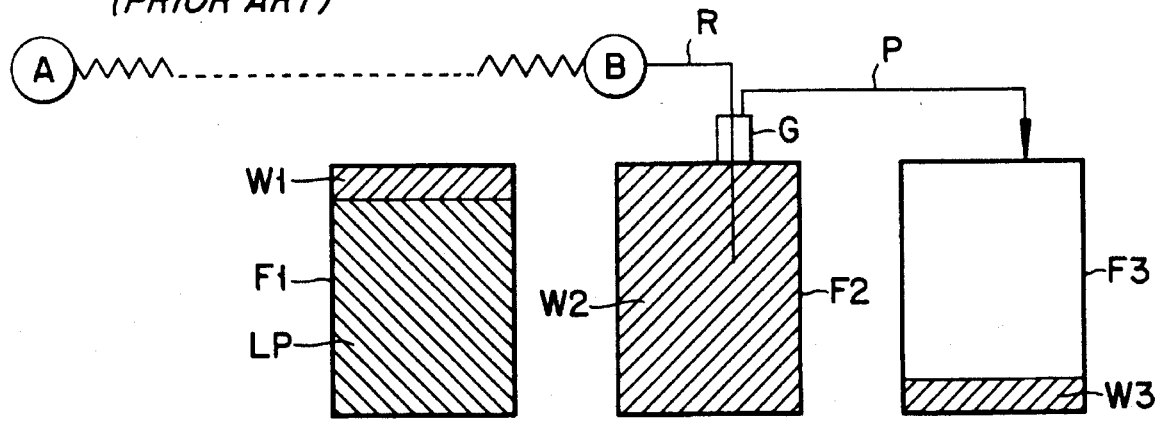
FIG. 1C is a view similar to FIG. 1B at the initiation of the filling of a second drum with white phosphorus according to the prior art.

A drum filling apparatus comprises a dispensing head 1, comprising a housing 1A provided with at least one hollow immersion rod 2 which is substantially vertical and at least three valves 3, 4, and 5. At least two of the valves 3 and 4 are connected via pipes 6 and 7 to respective connecting elements 8 and 9. The elements 8 and 9 permit the dispensing head to be supplied with white phosphorus and hot water, respectively. The valve 5 is an outlet valve connected to the hollow immersion rod 2 and also to the valves 3, 4 via a Y-shaped pipe 10.

This dispensing head, connected to an actuator 11, is disposed in a cabinet 12, provided with openings formed by shutters 13 and 14 which can open and close automatically, permitting the entrance and exiting of drums. Each drum is seated on a powered roller conveyor 15.

The cabinet 12 may be equipped with a weighing machine 16 on which the roller conveyor 15 and the drum F to be filled rest during the filling operation.

This cabinet is equipped with connecting elements such as 17 and 18 which can be connected especially to external pipes 19 and 20.

The connecting elements 8 and 9 of the dispensing head 1 are respectively connected to the connecting elements 17 and 18 via flexible hoses 21 and 22 of a length permitting a vertical to-and-fro movement of the dispensing head 1 within a guide 30.

The hollow immersion rod 2 has a length sufficient for enabling the injection of the liquids at as small a distance as possible from the bottom of the drum to be filled.

Concerning the filling of the drum F with liquid white phosphorus and hot water, the liquid white phosphorus coming from a storage container S is supplied to the dispensing head 1 by means of the pipe 19 and the hose 21. A mass flowmeter 23 advantageously placed in front of the connecting element 17 makes it possible to confirm, accurately, the quantities of liquid phosphorus delivered.

The hot water is supplied to the dispensing head 1 via the pipe 20 and the hose 22. A water meter 24 advantageously placed in front of the connecting element 18 makes it possible to confirm, accurately, the quantities of hot water delivered.

The operations of hot water filling (FIG. 2C), liquid white phosphorus filing (FIG. 2D), rinsing of the hollow rod with hot water (FIG. 2E) and weighing the quantities of hot water $Q_1$ and $Q_3$ and of liquid white phosphorus $Q_2$ may be controlled automatically with two microprocessors accompanied by meters.

The characteristics of the other devices used for the implementation of the method according to the invention such as instrumentation equipment (thermometers, position sensors), and automatic equipment (servo devices) are known to those skilled in the art and do not themselves form the subject of the present invention.

The cabin 12 may be equipped with safety deices (not shown in FIG. 4) such as a leak-tight retaining dish, a fume extractor, water sprays, and an emergency stop.

The method according to the invention has a number of advantages. It prevents almost completely the lengthy and dangerous manual operations and, consequently, ensures safer working conditions and more effective protection of the personnel.

It also makes it possible to obtain an accurate weighing of the liquids to be drummed. It further makes it possible to reduce considerably the time for filling a drum and, consequently increases productivity.

In operation, 215-liter drums F are placed on powered roller conveyors which are transported to the cabinet 12.

Figure 2A:
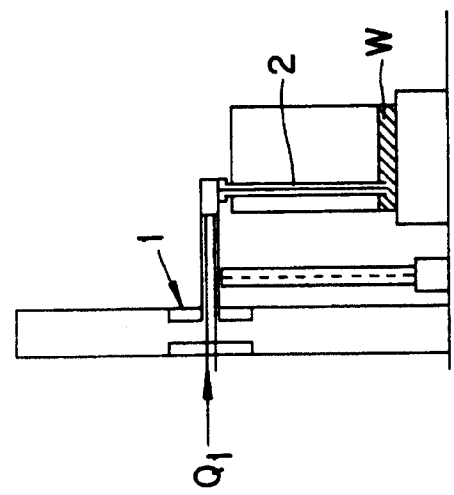
FIG. 2A is a schematic side elevational view of an apparatus according to the present invention at the initiation of a drum filling operation.
Figure 2C:
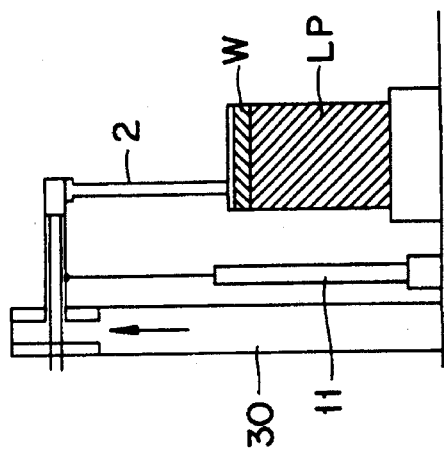
FIG. 2C is a view similar to FIG. 2B after a specified quantity of hot water has been introduced into the drum through the fill pipe.
Figure 2B:
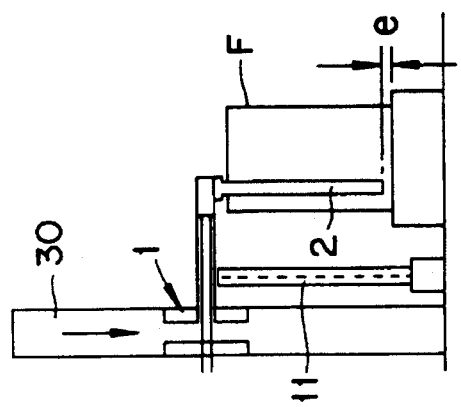
FIG. 2B is a view similar to FIG. 2A after a fill pipe has been lowered into the drum.
Figure 2E:
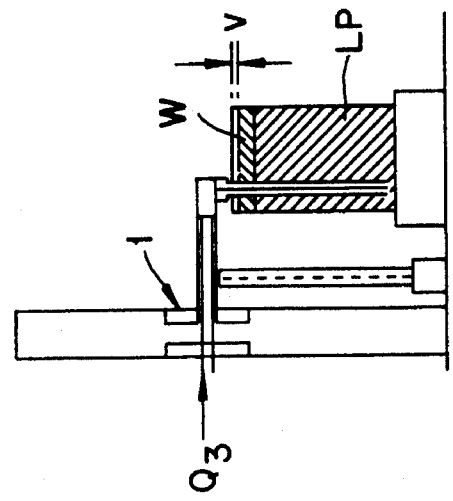
FIG. 2E is a view similar to FIG. 2D as a second prescribed quantity of hot water is introduced into the drum in order to flush the fill pipe.
Figure 2D:
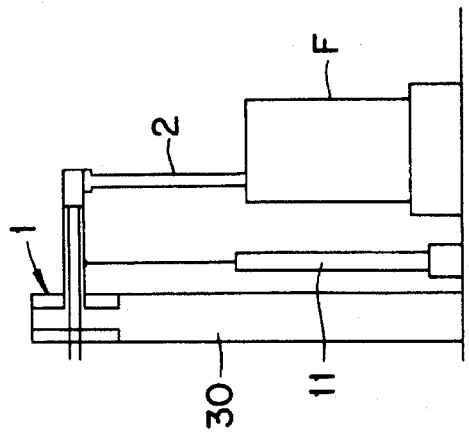
FIG. 2D is a view similar to FIG. 2C after a prescribed quantity of white phosphorus has been introduced into the drum.

When the shutter 14 opens automatically, a roller conveyor and its drum F are moved in and positioned onto the weighing machine 16. A conventional electronic position sensor stops the drum when sensing that the opening of the drum is positioned just beneath the end of the hollow immersion rod as shown in FIG. 2A. According to a preestablished program, the head 1 is lowered by the actuator 11, bringing the end of the hollow immersion rod to a spacing e, preferably 2 cm, from the bottom of the drum F (see FIG. 2B). Then, the valves 4 and 5 are opened and a quantity $Q_1$ (e.g., 12 liters) of hot water at 60° C. is introduced into the drum (see FIG. 2C). The valve 4 is closed, and then the valve 3 is opened and a quantity $Q_2$, e.g., 330 Kg, is opened and liquid white phosphorus at 60° C. is injected (see FIG. 2D) according to the following weights and flow rates:

15 Kg. at 0.9 tons/hour (low flow rate); then

300 Kg. at 9.0 tons/hr (high flow rate); and then

15 Kg. at 0.9 tons/hr (low flow rate).

Then, the valve 3 is closed and the valve 4 is opened and a quantity $Q_3$ (e.g., 2 liters) of hot water is injected to carry out a rinsing of the hollow immersion rod 10. The water, being of less density than the white phosphorus, rises to the top of the phosphorus, and leaves an air gap V below the top of the drum.

Figure 2F:
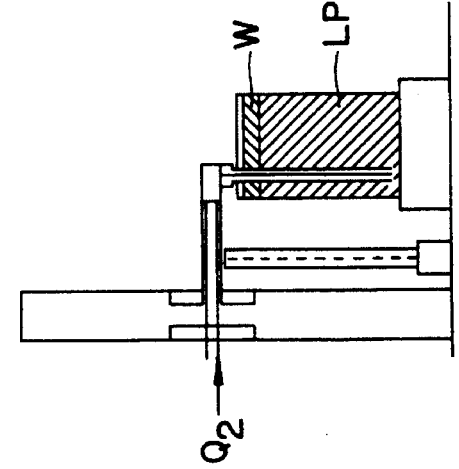
FIG. 2F is a view similar to FIG. 2E after the fill pipe has been raised and is allowed to drip into the drum.
Figure 3:
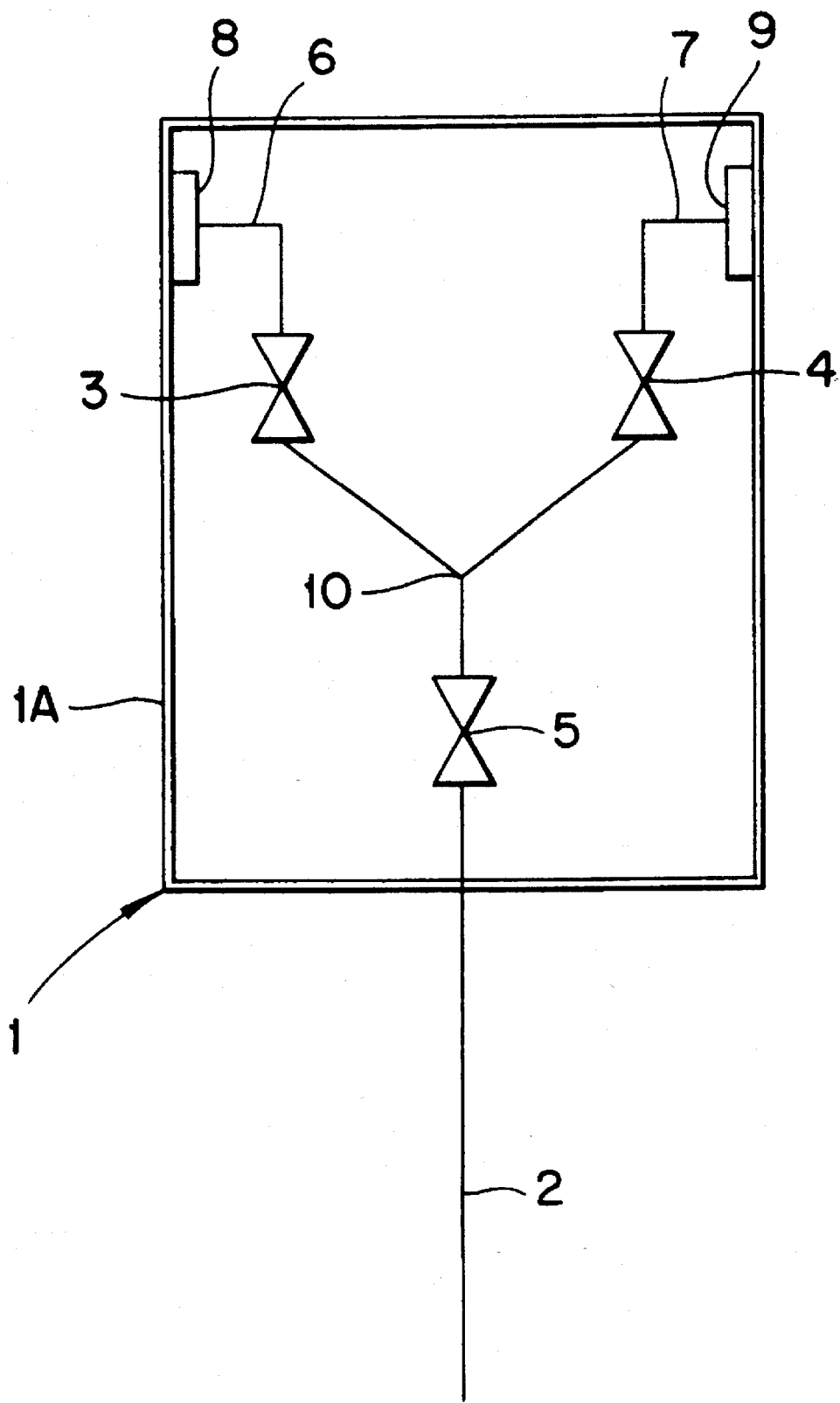
FIG. 3 is a schematic side elevational view of a dispensing head according to the present invention.

The valves 4 and 5 are then closed, and the head 1 is partially raised in such a manner that the hollow rod can drip (see FIG. 2F). The head is then raised to its maximum extent, and the roller conveyor is subsequently directed towards the opening 13 where the shutter opens automatically while another drum arrives via shutter 14.

The drum thus filled is manually closed, labeled and automatically progressed to a storage zone.

The weight of drummed phosphorus is 300 Kg and the filling took 10 min.

In order to insert a ton of liquid white phosphorus into 215 liter drums, approximately 30 min. as required.

By way of comparison, using the "manual" method approximately 2-½ hr. were required in order to drum the same quantity into identical drums.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims.

What is claimed is:

1. Apparatus for filling a drum with first and second immiscible liquids which are inert when combined, said liquids being of different densities, said apparatus comprising a dispensing head including:

a housing, a first inlet in said housing for introducing said first liquid, a second inlet in said housing for introducing said second liquid, a first valve carried by said housing for opening and closing said first inlet, a second valve carried by said housing for opening and closing said second inlet, first and second conduits carried by said housing for conducting said first and second liquids from said first and second inlets, respectively, a common outlet conduit for said first and second liquids, said common outlet conduit being carried by said housing and including a first inlet end connected to both said first and second conduits, and a second outlet end, and a third valve located in said outlet conduit downstream of said first end and upstream of said second end for opening and closing said outlet conduit, said apparatus further comprising means for positioning a drum beneath said outlet conduit, and an actuator connected to said housing for raising and lowering said dispensing head to insert said outlet conduit into a drum opening.

2. Apparatus according to claim 1 including a cabinet in which said head and positioning means are disposed, said cabinet including connecting elements connected to first and second external pipes for conducting said first and second liquids, respectively, and first and second flexible hoses connecting said first and second connecting means to said first and second inlets, respectively.

3. Apparatus according to claim 2 including a flowmeter disposed upstream of at least one of said first and second connecting elements.

4. Apparatus according to claim 2 including flow meters disposed upstream of both of said first and second connecting elements.

5. Apparatus according to claim 1, wherein said first and second valves, and said third valve are disposed inside of said housing.

6. Apparatus according to claim 5, wherein said first and second valves are disposed in said first and second conduits, respectively, upstream of said third valve.

* * * * *